UNITED STATES PATENT OFFICE.

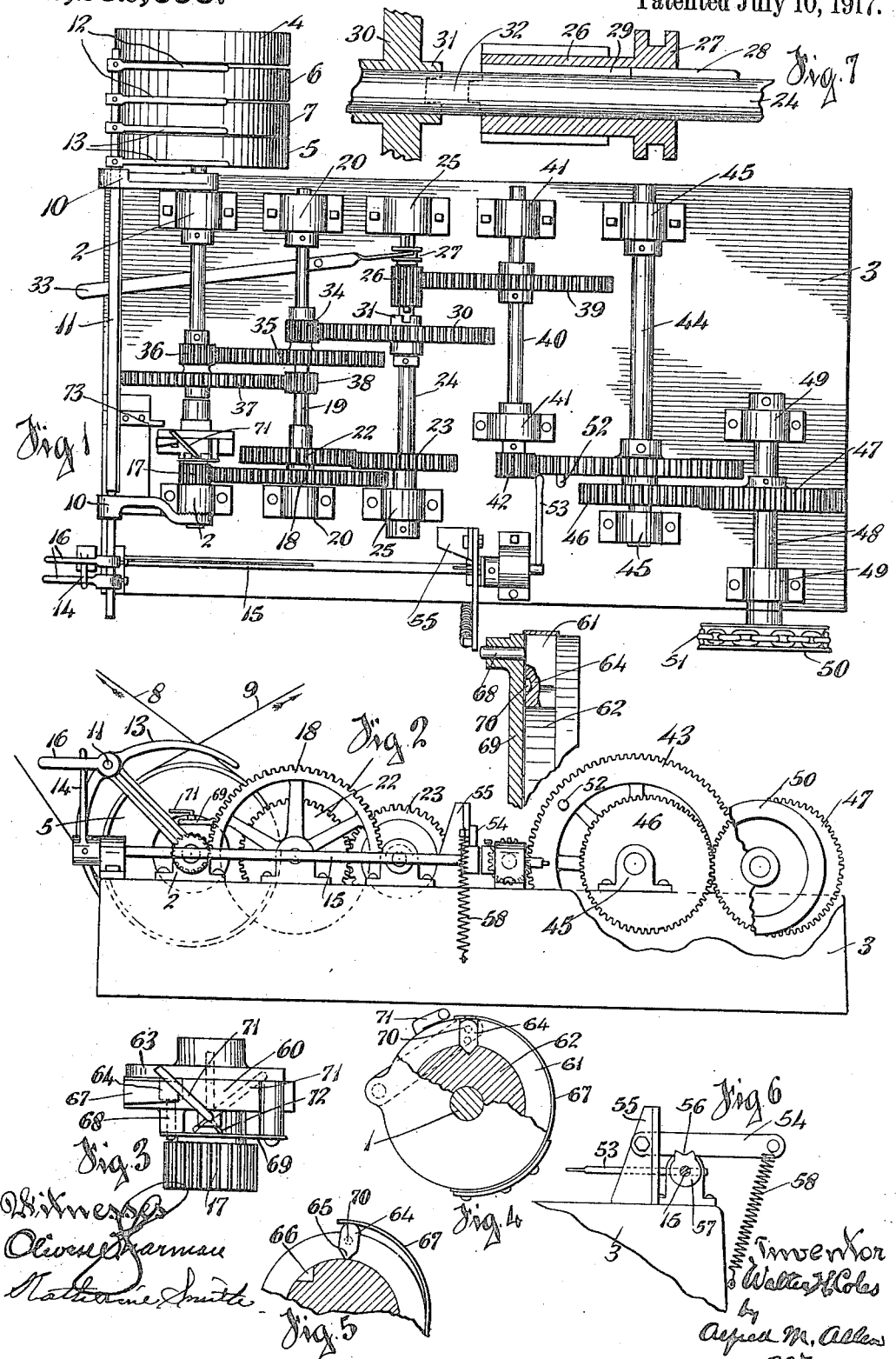
W. H. COLES.
GEARING.
APPLICATION FILED OCT. 20, 1913.
1,232,658.
Patented July 10, 1917.

WALTER H. COLES, OF TROY, OHIO.

GEARING.

1,232,658. Specification of Letters Patent. Patented July 10, 1917.

Application filed October 20, 1913. Serial No. 796,159.

*To all whom it may concern:*

Be it known that I, WALTER H. COLES, a citizen of the United States, and a resident of the city of Troy, in the county of Miami and State of Ohio, have invented certain new and useful Improvements in Gearing, of which the following is a full, clear, and exact description, reference being had to the accompanying drawings, forming part of this specification.

In connection with systems of irrigation it has been customary to employ a series of sprinkler pipes erected above and parallel to the ground to be irrigated and provided with a series of nozzles throughout their length. For distribution of the water it is also customary to provide mechanism for automatically oscillating the pipes longitudinally to continuously change the direction of the nozzles so as to distribute the water over as wide an area as possible. As the nozzles are oscillated from side to side in the arc of a circle, if the oscillation is at a uniform speed less water will be distributed as the nozzles reach a vertical position than when the nozzles approach a horizontal position, inasmuch as when approaching the former position a slight change of direction of the nozzles covers for the falling water much more space than when approaching the latter position.

Moreover in distributing the water through the nozzles, it is frequently desired to change the general speed of the oscillation or rotation of the pipes.

My invention relates to apparatus for automatically effecting the oscillation or rotation of the water distribution pipes, both to uniformly vary the speed of oscillation during each movement from side to side and generally to change the rate of movement. A further object is to provide means for automatically disconnecting the driving mechanism should the operating mechanism become clogged in any way and thus to prevent breakage of any of the parts.

The invention consists of that certain novel construction and arrangement of parts to be hereinafter particularly pointed out and claimed whereby the above results are attained in a most effective and satisfactory manner.

In the drawings,

Figure 1 is a top plan view of my improved mechanism.

Fig. 2 is a side elevation of the same.

Fig. 3 is a top plan view of the safety clutch mechanism.

Fig. 4 is a side elevation of the same, partly in cross section.

Fig. 5 is a portion of the construction as illustrated in Fig. 4, with one of the clutch members moving with relation to the other.

Fig. 6 is a side elevation of the latch for holding the shifting lever and the rock shaft.

Fig. 7 is a detail longitudinal section showing the pinion clutch for changing the speed.

I have not thought it necessary to illustrate the system of irrigating pipes as this forms no part of my present invention, and it will be understood that the oscillation or rotation of the pipes is imparted through the chain or cable which is connected with the pipe system and which is driven by my improved operating mechanism, as will be hereinafter described.

The driving shaft 1 of my improved device is mounted in suitable journal boxes 2, 2, transversely on the base 3, and this shaft is continuously driven in either direction by belts and pulleys. In the embodiment of my invention as illustrated, the shaft 1 is provided with two tight pulleys 4, 5, and two loose pulleys 6, 7. As indicated by the arrows in Fig. 2, one of the belts, as 8, is a directly running belt, and the other, as 9, is twisted so as to run in the opposite direction. Mounted on suitable supports 10, 10, at one end of the base, is the shifting lever 11, carrying two sets of fingers 12 and 13, and this belt shifter is operated to shift the belts with each rotation of the main driving gear as will be hereinafter described, by the arm 14 which extends upwardly from the shifting lever rock shaft 15 between the fingers 16, 16, on the shifting lever 11. The shaft 15 is mounted in suitable bearings and arranged to be rocked so as to transversely actuate the belt shifter.

Mounted on the shaft 1 is the driving pinion 17 which engages the gear 18 keyed on the shaft 19, journaled in boxes 20, 20, on the base parallel to the shaft 1. This shaft 19 also carries the gear 22 keyed thereon, which engages the gear 23 on a similarly mounted shaft 24 journaled in the boxes 25, 25. This shaft 24 carries the pinion 26 and its grooved collar 27. The pinion is in one position keyed to the shaft 24 to slide thereon by the key 28, engaging in the keyway 29 in the pinion and collar. Mounted loosely on the same shaft 24 is the gear 30, the hub 31 of which is provided with a clutch member to be engaged by the corresponding clutch member 32 on the pinion 26. The key 28 is of such length that when the collar 27 and its pinion 26 is shifted by the hand lever 33, the pinion and collar will be disengaged from the shaft 24 and the pinion will become clutched to the gear 30. This gear 30 meshes with the pinion 34 loosely mounted on shaft 19 and this pinion is secured to or a part of the gear 35, also loosely mounted on the shaft 19, which gear engages the pinion 36 loosely mounted on the shaft 1, and carrying secured thereto, or a part thereof the loosely mounted gear 37. This gear engages the pinion 38 which is tight on the shaft 19.

By this arrangement of gears, I am enabled to drive the gear 39 mounted on the shaft 40, journaled in the box 41, at two very different rates of speed.

When the pinion 26 rides on the key so as to be connected to the shaft 24, the gear 39 is driven by the train of gears 17, 18, 22, 23 and 26. When the pinion 26 has been shifted to run loose on shaft 24 and to engage the gear 30, then the gear 39 is driven at a very much slower speed with the train of gears and pinions 17, 18, 38, 37, 36, 35, 34, 30 and 26.

In this way, I provide for the two driving speeds.

The shaft 40 carries the pinion 42 and meshes with the gear 43 on shaft 44, mounted in journal boxes 45 on the base. On the outer end of the shaft 44 is mounted the eccentric gear 46, which meshes with a similar eccentric gear 47 on the shaft 48, mounted in the journal boxes 49, 49 on the base. This shaft 48 carries the pulley 50 over which runs the chain or cable 51, which is connected with the pipe system to be oscillated by my apparatus.

The cable 51 is so connected to the irrigating apparatus that when the irrigating nozzles are at their vertical position, the eccentric gear 47 will have its shortest diameter in mesh with the longest diameter of the corresponding eccentric gear 46, so that at this point the pulley 50 and the cable 51 will be moving at its slowest rate. While on the other hand, when the eccentric gears are in opposite position, the pulley and cable will be moving at its highest rate of speed.

In order that the movement of the pulley 50 may be reversed with each rotation, the gear 43 is provided with a pin 52 projecting from its face which is arranged to come in contact with the outer end of the arm 53 on the rock shaft 15, and thus to shift the belt shifter to change the belts and reverse the movement of the driving shaft.

In order to hold the rock shaft in either of the two positions to which it is rocked by the pin 52 contacting with the arm 53, I provide a latch lever 54 (Fig. 6), pivoted on the bracket 55 on the base and provided with a tooth 56 to engage a corresponding notch in the collar 57 mounted on the shaft 15. The latch is held in engagement with the notched collar by the spring 58.

In order to prevent any damage that might occur from any foreign matter getting in the gearing or from overloading, I provide a clutch and automatic release for the driving shaft 1. The pinion 17 is mounted loosely on the shaft 1 and carries one member of the clutch 60. This member 60 is a circular disk with a peripheral flange 61, which flange fits over the central hub portion 62 on the disk 63, forming the other member of the clutch. The disk 63 is secured tightly on the shaft 1 and always rotates with it. The flange 61 is provided with a radial socket in which is loosely fitted a dog 64 having a beveled end 65 to enter a V-shaped notch 66 in the periphery of the hub 62. A spring 67 is secured to the flange 61, and bears upon the dog to hold the same in engagement with the notch under normal conditions.

Should the gearing be stopped for any reason, the driving shaft will continue to rotate, but the dog will be forced out of the notch 66 against the pressure of the spring 67, as shown in Fig. 5, and in this position the pin 68 on the spring plate 69 will engage in the recess 70 in the dog and hold the dog out of engagement with the periphery of the hub 62 and in this way the driving shaft will be entirely disengaged from the mechanism. In order to return the clutch to operative position, I provide the lever 71, the inner end of which bears upon the spring plate 69. By turning the lever 71 midway between its two opposite positions, the plate 69 is raised and with it the pin 68, thus releasing the dog, so that as the hub is rotated the dog will be forced into the notch and thus the two clutch members will be locked together.

In order to set the device for the next accidental stoppage or overload, a plate 73 is secured to the base and the outer end of the lever 71 strikes against the plate and returns the lever to its normal position.

With my improvements, therefore, no possible damage can result from a constant drive of the driving shaft and a stoppage of the gearing or overloading of the system.

The moment this occurs the clutch with the driving shaft is automatically released.

It is understood that the location of the safety clutch need not be on the driving shaft, the only requisite for its position being that it shall cut off the power from applying itself to the pulley 51 which oscillates the sprinklers. It could well be mounted on the shaft 44, for example, or on the shaft 48.

Having thus described my invention, what I claim as new and desire to secure by Letters Patent, is:—

1. In an operating device, a train of driving gears, gearing for slow speed and gearing for high speed, operatively connected to the driving gears, and gearing connected to the member to be operated and to the slow and high speed gearing, a clutch connected to the driving gears, and means for driving the clutch, said clutch having automatically releasable means for disconnecting its parts upon stoppage of either train of high or low speed gearing.

2. In an operating device, a driving shaft, gearing to be driven, a clutch for transmission of power between them, said clutch having automatically releasable means for unclutching it upon stoppage of the gearing to be driven, and means for retaining it in unclutched position.

3. In an operating device, a driving shaft, gearing to be driven, a clutch for transmission of power between them, said clutch having a spring-held connection between the parts thereof, and means for automatically holding the parts out of connection, for the purpose described.

4. In an operating device, a driving shaft, a train of driving gears, a gearing for slow speed and a gearing for high speed operatively connected to the driving gears, a clutch connecting the driving shaft to the train of driving gears, spring-held means comprising part of the clutch for automatically disconnecting the clutch upon stoppage of any of the gears, and means for automatically holding the clutch in disconnected position.

5. In an operating device, a driving shaft, gearing to be driven, a clutch connecting the said gearing and shaft, spring-held means for automatically disconnecting the clutch upon stoppage of the gearing to be driven, spring-held means for holding the former spring-held means in disconnected position, means for releasing the latter spring-held means, and means for automatically throwing it into operative position again, for the purpose described.

6. In an operating device, a driving shaft, gearing to be driven, a clutch connecting said shaft and gearing comprising a dog, and means for automatically releasing it upon stoppage of the gearing to be driven, a pin adapted to hold said dog in released position, means for actuating the pin, means for withdrawing the actuating means, and means for automatically releasing said means, for the purpose described.

7. In an operating device, a driving shaft, a train of driving gears, a driven gearing, a train of gearing for slow speed, a train of gearing for high speed, said gear trains comprising intermeshing gears and shafts, and means to shift one of the pinions of the driven gearing to engage either speed train as desired.

8. In an operating device, a driving shaft, a slow speed gear mechanism and a high speed gear mechanism, an operative connection between said slow and high speed mechanisms and the driving shaft, comprising a clutch, said clutch having automatically releasable means for altogether unclutching it, gearing to be driven and a shiftable connection from the slow and high speed mechanisms to said gearing to be driven.

9. In an operating device, a driving shaft, a slow speed gear mechanism and a high speed gear mechanism, an operative connection between said slow and high speed mechanisms and the driving shaft, comprising a clutch, said clutch having automatically releasable means for altogether unclutching it, gearing to be driven and a shiftable connection from the slow and high speed mechanisms to said gearing to be driven, said gearing to be driven comprising in part eccentric gears for varying the speed of operation for any mechanism to be operated thereby, for both slow and fast driving.

10. In an operating device, a driving shaft, a slow speed gear mechanism and a high speed gear mechanism, an operative connection between said slow and high speed mechanisms and the driving shaft, comprising a clutch, said clutch having automatically releasable means for altogether unclutching it, gearing to be driven and a shifting connection from the slow and high speed mechanisms to said gearing to be driven, said gearing to be driven comprising in part eccentric gears for varying the speed of operation for any mechanism to be operated thereby, for both slow and fast driving, and means for automatically reversing the driving shaft, after each operation of the eccentric gears.

11. In an operating device, a driving shaft, a slow speed gear mechanism and a high speed gear mechanism, an operative connection between said slow and high speed mechanisms and the driving shaft, comprising a clutch, said clutch having automatically releasable means for altogether unclutching it, gearing to be driven and a shifting connection from the slow and high speed mechanisms to said gearing to be driven, said gearing to be driven comprising in part eccentric gears for varying the speed of operation for any mechanism to be operated thereby, for both slow and fast driving, and means for automatically reversing the driving shaft, after each operation of the eccentric gears, comprising pulleys and forward and reverse belts for operating the driving shaft, belt shifting means and a contact element on said driven gearing for operating the belt shifter.

WALTER H. COLES.

Attest:
ANNA F. DIENST,
HELEN L. AICHHOLZ.

Copies of this patent may be obtained for five cents each, by addressing the "Commissioner of Patents, Washington, D. C."